PROGRAMMING DEVICE

Filed Dec. 20, 1956 2 Sheets-Sheet 1

INVENTOR
HARRY L. MASON
BY Isidore Match
ATTORNEY

INVENTOR
HARRY L. MASON
BY Isidore Match
ATTORNEY

United States Patent Office 3,061,188

Patented Oct. 30, 1962

3,061,188

PROGRAMMING DEVICE

Harry L. Mason, Noroton, Conn., assignor to Sperry Rand Corporation, New York, N.Y., a corporation of Delaware Filed Dec. 20, 1956, Ser. No. 629,638
8 Claims. (Cl. 235—61.11)

This invention relates to programming devices. More particularly it relates to such a device adapted for use with an input-output unit which is associated with data processing apparatus.

Input-output units associated with data processing apparatus, such as those generally utilized with punch-card systems, are sensing punching units having sequentially arranged sensing stations. Since the feed for each station is preferably independently clutched with suitable interlock circuits to prevent the simultaneous feeding of more than one card to the same sensing station or the feeding of a card into a station occupied by another card, there is made possible many patterns of card feeding. For example, in those units where there are provided upper and lower card feeding magazines feeding patterns such as Feed Upper, Feed Lower, Feed Both, etc., may be obtained.

It is quite often desirable that information from one sensing station, which reads the cards as it passes under the sensing brushes row by row, become available for use in a following sensing station for the same card. For example, a situation might arise where it would be desirable that the information sensed from a first sensing station where the card is read be available at say the third station which might also be a reading station. Since the feeding sequence in the input-output unit is not always in a rhythmic repetitive sequential pattern but is under control of the pattern of holes in the card or under control of a data processing apparatus with which the input-output unit is associated, the problem is presented of keeping track of the card in the input-output unit.

Heretofore, one method of solving this problem has been to control the position of a card associated with a particular bit of information in accordance with the programming of the data processing apparatus. This solution, however, places an added burden on the programmer and, in addition, uses up valuable high speed storage where high speed is not required. Also, in the case of overlapping operation, no use of the sensed data can be made in the cycle immediately following a particular sensing cycle. An example of such overlapping operation might occur where data from a first card in a sequence is receiving results, data is being calculated from a second card and an input data is being delivered to the data processing apparatus from the third card.

It is accordingly the primary object of this invention to provide a device adapted for use in a multi-feed, multi-station input-output machine wherein the card feeding is not according to any fixed pattern, which enables the use at a later time of control information which is passed along with the card from which it was sensed.

In accordance with this invention, there is provided a multi-feed input-output unit having a plurality of sequentially arranged sensing stations and having respective independently actuated card feeding means associated with each station, means for making available at one station the information sensed at a different station. The latter include means for storing an information signal sensed from a card in a given station and means responsive to the actuation of the card feeding means associated with this station for causing the output of an information signal from the storing means. Means is provided for retaining the information in the storing means from the time of its sensing at least to the time of the actuating of the card feeding means.

For a better understanding of the present invention together with other and further objects thereof, reference is had to the following description taken in connection with the accompanying drawing, and its scope will be pointed out in the appended claims.

In the drawings, FIG. 1 is a logical schematic representation of a preferred embodiment of the invention which illustrates the mechanism of operation thereof;

Figures 1, 2:
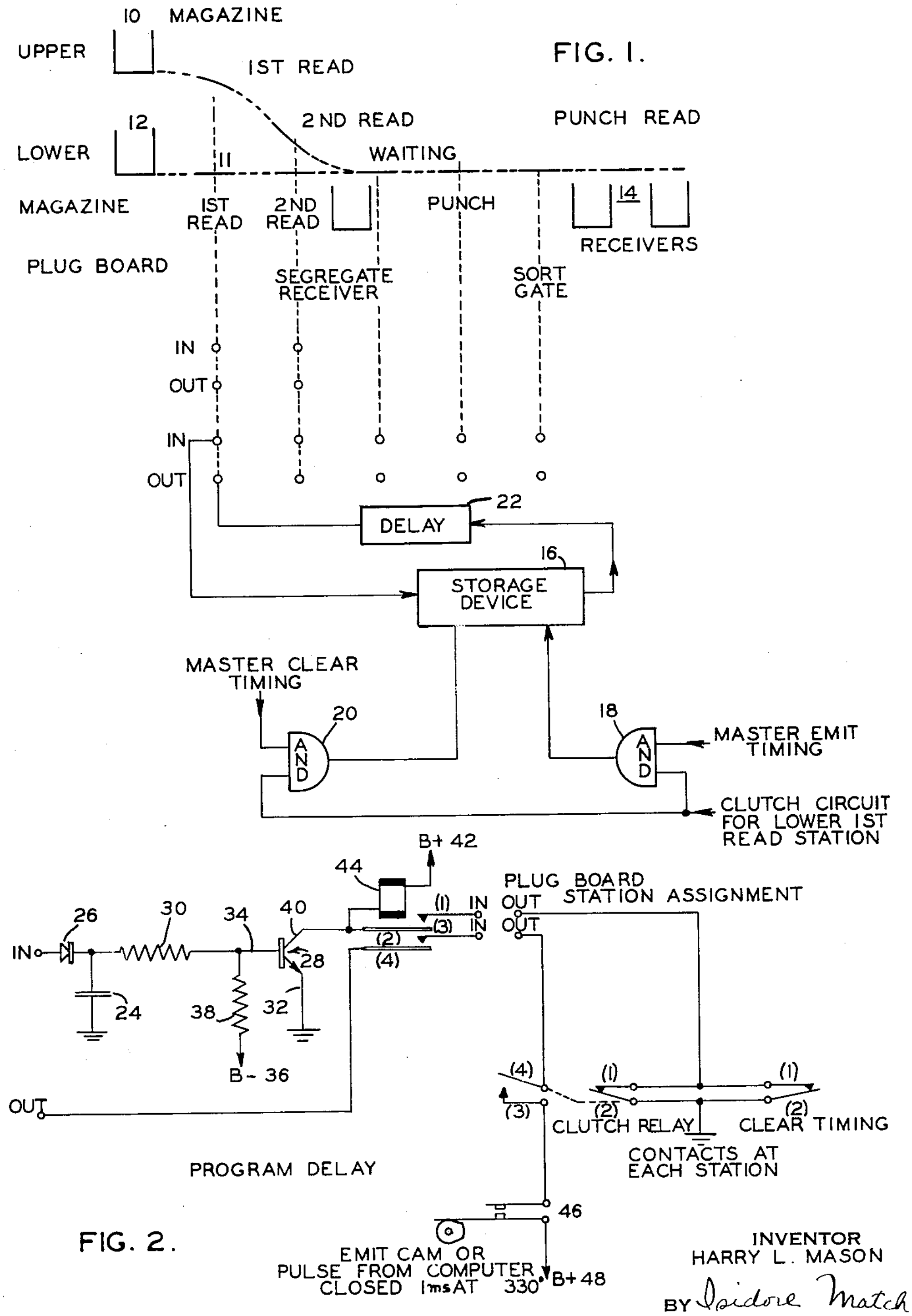
FIG. 2 depicts one physical example of FIG. 1 utilizing a transistor.

Referring now to FIG. 1, there is depicted schematically, a multi-feed input-output unit conveniently named a "Read Punch" unit and a circuit associated therewith which illustrates the mechanism of operation of the present invention. The "Read Punch" unit may suitably comprise respective upper and lower magazines 10 and 12 for feeding cards 11 to card sensing stations. These stations are arranged in seriatim and, as labelled in FIG. 1, may be a first "read" station, a second "read" station, a waiting station, a "punch" station, a sort gate, etc. The cards eventually are received in receivers generally designated by the numeral 14. In such a unit, the feed for each station is independently clutched with suitable interlock circuits being provided to prevent the feeding simultaneously of two cards into the same station, or feeding a card into a station already occupied by another card. Thus, with this type of unit, many patterns of card feeding may be called for such as Feed Upper, Feed Lower, Feed Both, etc.

The circuit associated with the "Read Punch" unit in FIG. 1 enables the utilization of information sensed from a card in one station at a different station. Information in the form of a pulse sensed from the "first read" station for example is stored in the storage device. The storage device 16 is caused to emit an output information pulse by actuation from the output of "and" gate 18. To effect an output from "and" gate 18, there must be simultaneously provided as inputs thereto, a pulse, conveniently legended as a "Master Emit Timing Pulse" and the energization of a clutch relay circuit for closing given contacts thereof. The clearing of the storage device 16 results from the application thereto as an input of the output of an "and" gate 20. To effect the production of an output from "and" gate 20, there must simultaneously occur the application thereto of a pulse conveniently legended as a "Master Clear Timing" pulse and the energization of the aforesaid clutch relay circuit. The output of the storage device 16 is suitably delayed by delay 22 a sufficient period to enable its use as an input to a similar programming device related to the next card station. The pick up signal to the second programming device thus arrives following the clear period.

In FIG. 2, an embodiment of the circuit of FIG. 1 and legended as a "Program Delay" is depicted. The pulse sensed from the "first read" station in the "Read Punch" unit of FIG. 1, for example, is applied across a capacitance 24 through a unilateral device such as a crystal rectifier 26 poled in the forward direction of current flow. Rectifier 26 is provided in the circuit to prevent discharge of the capacitance 24 since the sensed pulse is from a low impedance source. It is seen that the voltage appearing across capacitance 24 will have the shape of an integral function of the sensed pulse and thus effectively will lengthen the duration thereof. The lengthened pulse is applied to the input electrode of a translating device, which may conveniently be a transistor 28, through a series connected resistance 30. Transistor 28 may suitably be an NPN type having a grounded emitter 32, a base 34 returned to suitable negative potential source 36 through a resistance 38 and a collector 40 connected to a positive potential source 42 through a relay 44. Of course transistor 28 could be of the PNP or point contact type in which case it would merely be necessary for base 34 to be returned to an appropriate source of positive potential and collector 40 to be correspondingly connected to a source of negative potential. As is shown in FIG. 2, pairs of contacts 1 and 2 and 3 and 4 respectively are normally open in the unenergized state of relay 44. Contact 1 of relay 44 is connected to a chosen "in" hub of the plug board, its corresponding "out" hub being connected to respective contacts 1 of a clutch relay and a clear timing relay (not shown). Contact 3 of relay 44 is connected to an "in" hub of the plugboard, the corresponding "out" hub of which is connected to contact 4 of the clutch relay. Contact 3 of the clutch relay is connected to one pole of a contact breaker switch 46, the other pole of which is connected to a source of positive potential 48.

The operation of the circuit of FIG. 2 may be readily understood as follows. Initially, let it be assumed that information is being sensed from position 3 on a card, the card being in the "first read" station. At the time that position 3 is sensed, a positive rectangular pulse appears at the input to rectifier 26. This pulse is stretched as explained hereinabove, and the duration of the lengthened pulse is now long enough for relay 44 to be energized causing the closing of pairs of contacts 1 and 2 and 3 and 4 respectively thereof whereby a circuit is completed from the positive potential source 42, through relay 44, the jumpered associated "in" and "out" hubs and parallel arranged normally closed contacts 1 and 2 of both the clutch relay and the clear timing relay. At this time, collector 40 which is connected to contact 2 of relay 44 will assume ground potential but relay 44 will remain energized thereby holding its contacts closed. When the clutch relay is energized, contacts 1 and 2 thereof will open and 3 and 4 thereof will close. The clutch relay will of course be energized prior to the closing of contact breaker swich 46 so that when the latter is closed say at about 330° of the cycle of operation for about 1 milli-second, the application of positive potential for this time from source 48 will appear as an output pulse, the output pulse circuit being completed through closed switch 46, closed contacts 3 and 4 of the clutch relay, the jumpered associated "in" and "out" hubs and closed contacts 3 and 4 of relay 44. During this period, contacts 1 and 2 of the clear timing relay will remain closed and relay 44 will still remain energized since it will still be in the circuit from the positive potential source 42 to ground through closed contacts 1 and 2 of the clear timing relay. At a time after the application of the positive potential through closed contact breaker switch 46, contacts 1 and 2 of the clear timing relay will open due to the energization thereof, consequently deenergizing relay 44. The output pulse may be utilized to set a selector device (shown in FIG. 3) which becomes effective immediately and holds until the end of a cycle, or the output pulse could be used to set another "Program Delay" which in turn emits a pulse when the associated card is again fed by energizing the proper associated clutch relay. It is seen that if a given card remained in a particular sensing station for one or more cycles, the "Program Delay" would retain the information and not emit for as long as the card was held stationary.

Figure 3:
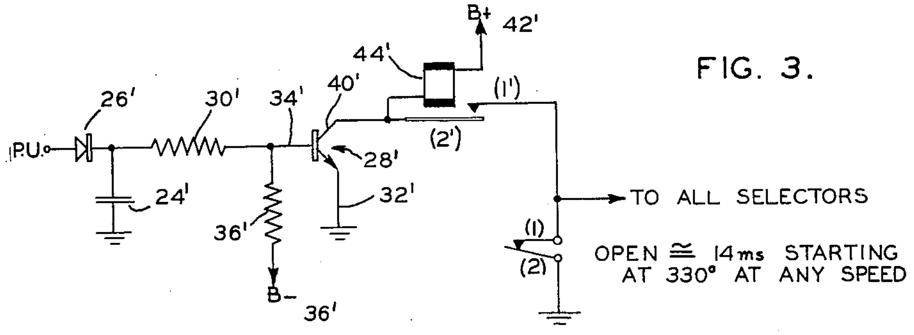
FIG. 3 shows a circuit similar to FIG. 2 in association with selectors.

In FIG. 3, upon the energization of relay 44', in a similar manner as that described in connection with relay 44 of FIG. 2, the closing of contacts 1' and 2' thereof will provide a current path from positive potential source 42', throuhg relay 44', contacts 1' and 2' thereof, and normally closed contacts 1 and 2 of the selector relays when the latter are in the unenergized state. The selector relays may be energized starting at about 330° of cycle operation at which time the contacts thereof remain open for about 14 milli-seconds.

Figure 4:
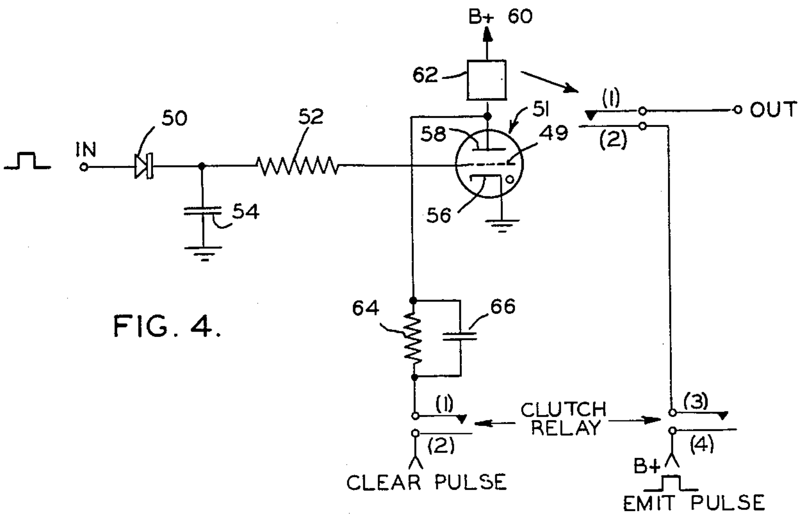
FIG. 4 is another embodiment of the invention utilizing a thyratron.

In FIG. 4, there is shown another embodiment of the present invention utilizing a thyratron. The sensed rectangular input pulse is applied to the control electrode 49 of a thyratron 51 through series connected rectifier 50 poled in the forward direction of current flow and a resistance 52. The capacitance 54 across which the input voltage to the thyratron is developed has one side grounded and its other side connected to the junction point of rectifier 50 and resistance 52. Cathode 56 is grounded and plate 58 is connected to a suitable source of positive potential 60 through a relay 62. Plate 58 is also connected to contact 1 of the clutch relay (not shown) through a parallel arrangement of a resistance 64 and a capacitance 66.

In the operation of the device of FIG. 4, thyratron 51 is rendered conductive upon the application of the positive input voltage thereto. This causes the energization of relay 62, as a result of which, contacts 1 and 2 thereof close.

Different from the devices FIGS. 2 and 3, the path to ground from the positive potential source 60 need not be provided since thyratron 51 will now remain conductive until its plate 58 is extinguished even though the input voltage is removed from its grid 49. At the point of the cycle that the clutch relay is energized, pairs of contacts 1 and 2 and 3 and 4 thereof respectively will close and an emit pulse will appear at the "out" terminal. Subsequently, a negative "clear" pulse applied through closed contacts 3 and 4 of the clutch relay to plate 58 will extinguish thyratron 51, thereby deenergizing or clearing relay 62.

Figure 5:
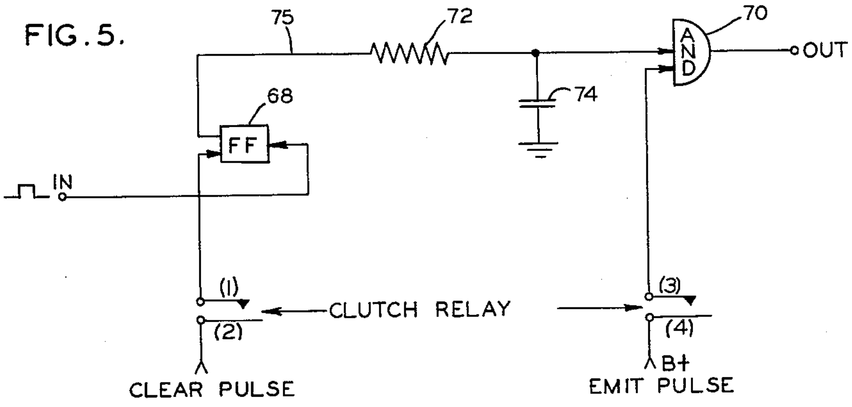
FIG. 5 is a third embodiment of the invention utilizing a bi-stable device.

FIG. 5 depicts an embodiment of the present invention utilizing a bi-stable device such as a flip-flop. In the circuit shown, one input to a flip-flop 68 is the pulse sensed from the card sensing station in the "Read Punch" unit. The other input is connected to contact 1 of the clutch relay (not shown). The output of flip-flop 68 is applied as a first input to an "and" gate 70 through a resistance 72, the second input to "and" gate 70 being connected to contact 3 of the clutch relay. A capacitance 74 has one side grounded and its other side connected to the junction of resistance 72 and gate 70.

In operation, for convenience, it may be assumed that the application of the sensed input pulse to flip-flop 68 will cause the voltage on line 75 to go high. Now, when the clutch relay is energized to cause its pairs of contacts 1 and 2 and 3 and 4 respectively to close and a positive emit pulse is applied through closed contacts 3 and 4, a positive output pulse will be produced from "and" gate 70. When a subsequent clear pulse is thereafter applied to flip-flop 68 to switch the conductivity therein, the voltage on line 75 will go low, effectively clearing flip-flop 68 and preventing an output from "and" gate 70.

While there have been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a multi-feed input-output unit having a plurality of sequentially arranged sensing stations each having a cycle of operation and having respective independently actuated card feeding means associated with each station, means for making available at one of the stations, information sensed at a different station comprising means for lengthening the duration of a pulse, transistor means, means for applying an information pulse sensed from a card at a given station as an input to said transistor means through said pulse duration lengthening means, signal storing means, means for applying the output of said trnsistor means to said signal storing means, switch means actuated during a portion of said cycle, means responsive to the actuation of the card feeding means associated with said given station and said switch means for causing the output of an information signal from said storing means, means for retaining said information in said storing means at least to the time of actuation of said card feeding means, and means for clearing said storing means.

2. In a multi-feed input-output unit having a plurality of sequentially arranged sensing stations each having a cycle of operation and having respective independently actuated card feeding means associated with each station, means for making available at one of the stations information sensed at a different station comprising an NPN transistor having emitter, base, and collector electrodes, said emitter being grounded, said base being returned to a source of negative potential, an electro-magnetic relay, said collector being connected to a source of positive potential through said relay, means for lengthening the duration of a pulse comprising a capacitance connected in shunt with the input of said transistor and a resistance in series with said input, means for applying an information pulse sensed from a card in a given sensing station to said base through said pulse duration lengthening means, a plurality of pairs of contacts associated with said relay which are normally open when said relay is in the unenergized state, switch means associated with a pair of said contacts for permitting the passage of a signal through said contacts during a portion of each cycle of operation of each sensing station, means responsive to the actuation of the card feeding means associated with said given station and said switch means for providing an output signal through one of said pairs of contacts when said relay is energized, and means for deenergizing said relay.

3. In a multi-feed input-output unit having a plurality of sequentially arranged sensing stations and having respective independently actuated card feeding means associated with each station, means for making available at one of the stations information sensed at a different station comprising an NPN transistor having emitter, base, and collector electrodes, said emitter being grounded, said base being returned to a source of negative potential, a first electromagnetic relay, said collector being connected to a source of positive potential through said first relay, means for lengthening the duration of a pulse comprising a capacitance connected in shunt with the input of said transistor and a resistance connected in series with said input, a first pair of contacts associated with said relay which are normally open when said first relay is unenergized, one of said contacts being connected to said collector, a second electromagnetic relay associated with said card feeding means, a second pair of contacts associated with said second relay which are normally closed when said second relay is unenergized, one of said second pair of contacts being grounded, a third electromagnetic relay, a third pair of contacts associated with said third relay which are normally closed when said third relay is unenergized, one of said third pair of contacts being connected to said one of said second pair of contacts, the other of said third pair of contacts being connected to the other of said second pair of contacts, means for connecting said first pair of contacts to said second and third pairs of contacts whereby when said first relay is energized, a circuit is completed from said source of positive potential through said first relay to ground, a fourth pair of contacts associated with said first relay which are normally open when said first relay is unenergized, a fifth pair of contacts associated with said second relay which are normally open when said second relay is unenergized, and means for connecting said fourth pair of contacts to said fifth pair of contacts.

4. In a multi-feed input-output unit as defined in claim 3 and further including means for applying a pulse to one of said fifth pair of contacts whereby an output pulse is provided through said closed fifth and fourth pairs of contacts when said first and second relays are energized.

5. In a multi-feed input-output unit as defined in claim 4 and further including a rectifier poled in the forward direction for applying said sensed information pulse across said capacitance.

6. In a multi-feed input-output unit having a plurality of sequentially arranged sensing stations each having a cycle of operation and having respective independently actuated card feeding means associated with each station, means for making available at one of the stations information sensed at a different station comprising transistor means, means for lengthening the duration of a pulse including a capacitance in shunt with the input of said translating means and a resistance in series with said input, means for applying an information pulse sensed from a card at a given station as an input signal to said transistor means through said pulse duration lengthening means, signal storing means, switch means actuated during a portion of each cycle of operation of said sensing station, means for applying the output signal of said transistor means to said signal storing means, means responsive to the actuation of the card feeding means associated with said given station and said switch means for causing the output of an information signal from said storing means, means for retaining said information in said storing means at least to the time of actuation of said card feeding means, and means for clearing said storing means.

7. In a multi-feed input-output unit having a plurality of sequentially arranged sensing stations each having a cycle of operation and having respective independently actuated card feeding means associated with each station, means for making available at one of the stations, information sensed at a different station comprising means for lengthening the duration of a pulse, a transistor, means for applying an information pulse sensed from a card at a given station as an input to said transistor through said pulse duration lengthening means, signal storing means, means for applying the output of said transistor to said signal storing means, switch means actuated during a portion of each cycle of operation of each said sensing station, means responsive to the actuation of the card feeding means associated with said given station and said switch means for causing the output of an information signal from said storing means, means for retaining said information in said storing means at least to the time of actuation of said card feeding means, and means for clearing said storing means.

8. In a multi-feed input-output unit having a plurality of sequentially arranged sensing stations each having a cycle of operation and having respective independently actuated card feeding means associated with each station, means for making available at one of the stations, information sensed at a different station comprising means for lengthening the duration of a pulse, a junction-type transistor having emitter, collector and base electrodes, said emitter being connected to a source of reference potential, means for applying an information pulse sensed from a card at a given station as an input signal to said base electrode through said pulse duration lengthening means, signal storing means, means for applying the output signal from said transistor to said signal storing means, switch means actuated during a portion of each cycle of operation of said sensing station, means responsive to the actuation of the card feeding means associated with said given station and said switch means for causing the output of an information signal from said storing means, means for retaining said information in said storing means at least to the time of actuation of said card feeding means, and means for clearing said storing means.

References Cited in the file of this patent

UNITED STATES PATENTS 2,275,396 Johnson ---------------- Mar. 3, 1942